(12) United States Patent
Kim

(10) Patent No.: US 12,655,929 B2
(45) Date of Patent: Jun. 16, 2026

(54) APPARATUS FOR REDUCING PERCEIVED WEIGHT OF VR HEADSET

(71) Applicant: Hyuntae Kim, Seoul (KR)

(72) Inventor: Hyuntae Kim, Seoul (KR)

( * ) Notice: Subject to any disclaimer, the term of this patent is extended or adjusted under 35 U.S.C. 154(b) by 58 days.

(21) Appl. No.: 18/801,990

(22) Filed: Aug. 13, 2024

(65) Prior Publication Data

US 2025/0361970 A1    Nov. 27, 2025

(30) Foreign Application Priority Data

May 23, 2024    (KR) ........................ 10-2024-0066903

(51) Int. Cl.
*F16M 11/04* (2006.01)
*G06F 1/16* (2006.01)

(52) U.S. Cl.
CPC ............. *F16M 11/04* (2013.01); *G06F 1/163* (2013.01); *F16M 2200/04* (2013.01)

(58) Field of Classification Search
CPC ..... F16M 11/04; F16M 2200/04; G06F 1/163
See application file for complete search history.

(56) References Cited

U.S. PATENT DOCUMENTS

| | | | | | |
|---|---|---|---|---|---|
| 5,577,981 | A | * | 11/1996 | Jarvik | A63B 24/00 |
| | | | | | 482/4 |
| 8,152,699 | B1 | * | 4/2012 | Ma | A61H 1/0229 |
| | | | | | 482/54 |
| 9,713,439 | B1 | * | 7/2017 | Wu | A61B 5/221 |
| 10,179,598 | B1 | * | 1/2019 | Goodbinder | H05K 5/0234 |
| 11,824,337 | B1 | * | 11/2023 | Bennett | H02G 3/30 |
| 2012/0018249 | A1 | * | 1/2012 | Mehr | A63B 69/0064 |
| | | | | | 182/5 |
| 2017/0171992 | A1 | * | 6/2017 | Long | G02B 27/0176 |
| 2020/0027272 | A1 | * | 1/2020 | Abbott | G06F 3/04815 |
| 2021/0165232 | A1 | * | 6/2021 | Zhang | G02B 27/0176 |
| 2025/0167534 | A1 | * | 5/2025 | Bartlett | G02B 27/0176 |

FOREIGN PATENT DOCUMENTS

| | | | | | |
|---|---|---|---|---|---|
| DE | 202016103302 U | * | 7/2016 | | G06F 3/011 |
| KR | 10-2616113 B1 | | 12/2023 | | |

OTHER PUBLICATIONS

Flit Lift GraviPro VR lifter video on Youtube, May 2024, https://www.youtube.com/watch?v=dfxipywmrW4 (Year: 2024).*

MRTV, "Make bigscreen beyond feel wires—VR Wire Il cable management system" youtube video dated Nov. 21, 2023 https://www.youtube.com/watch?v=LnT6lbaoGcQ (Year: 2023).*

Tino Soelberg Steelseries technology blog post titled "IKEA saved our lives in VR" dated May 11, 2016 (Year: 2016).*

Hanseob Kim "A Pilot Study on the Impact of Discomfort Relief Measures on Virtual Reality Sickness and Immersion" ACM digital library Oct. 2023, DOI: https://doi.org/10.1145/3611659.3616893 (Year: 2023).*

* cited by examiner

*Primary Examiner* — Terrell L McKinnon
*Assistant Examiner* — Ding Y Tan
(74) *Attorney, Agent, or Firm* — NKL LAW; Jae Youn Kim

(57)    ABSTRACT

Provided is an apparatus for reducing a perceived weight of a VR headset, and more particularly, an apparatus for reducing a perceived weight of a VR headset that reduces the perceived weight of the VR headset compared to an actual weight of the VR headset when a user wears the VR headset on his or her head.

15 Claims, 5 Drawing Sheets

APPARATUS FOR REDUCING PERCEIVED WEIGHT OF VR HEADSET

BACKGROUND

1. Field

The present disclosure relates to an apparatus for reducing a perceived weight of a VR headset, and more particularly, to an apparatus for reducing a perceived weight of a VR headset that reduces the perceived weight of the VR headset compared to an actual weight of the VR headset when a user wears the VR headset on his or her head.

2. Description of Related Art

Virtual reality refers to an interface between humans and computers that artificially creates a specific environment or situation and allows people using the artificially created environments or situations to feel as if they were interacting with the actual surroundings and environments.

The term virtual reality is often used interchangeably with other terms such as artificial reality, cyberspace, virtual worlds, virtual environment, synthetic environment, artificial environment, augmented reality, mixed reality, and spatial computing.

The purpose of use of the virtual reality is to allow people to experience and manipulate environments that are difficult to experience in everyday life, without actually experiencing the environments, and the application fields of the virtual reality are diverse, such as gaming, healthcare, education, and the film industry.

In the past, a headset device (e.g., head mount display (HMD)) for virtual experience is very expensive and heavy, which limits its versatility. However, recently, as a technology for manufacturing a VR headset device has advanced, a weight of the VR headset device has also gradually become lighter.

However, despite the advancement of technology for manufacturing a VR headset device, there is a limit to reducing the weight of the VR headset device because the VR headset device should be equipped with essential components such as a display, a lens, and a battery. Accordingly, most VR headset devices currently on the market are manufactured to weigh about 500 to 600 g.

Meanwhile, most VR headset devices are manufactured in a form in which the weight of the VR headset device is supported by a face and a crown of a head of a user.

Accordingly, the heavy weight is pointed out as the most uncomfortable thing when using the VR headset device for a long time.

As an example of the background art of the present disclosure, Patent Document 1 (Korean Patent Publication No. 10-2616113; Dec. 21, 2023) discloses a VR headset device in which an earphone unit and a VR glasses unit are mechanically and stably connected to each other, and enables comfortable wearing as well as excellent user comfort through excellent weight distribution.

The contents described as the background art are only for understanding the background of the present disclosure, and should not be accepted as acknowledging that it corresponds to related art already known to those skilled in the art.

SUMMARY

The present disclosure provides an apparatus for reducing a perceived weight of a VR headset, which reduces the perceived weight of the VR headset compared to an actual weight of the VR headset when a user wears the VR headset on his or her head.

Objects of the present disclosure are not limited to the above-mentioned objects. That is, other objects that are not mentioned may be obviously understood by those skilled in the art to which the present disclosure pertains from the following description.

According to an aspect of the present disclosure, an apparatus for reducing a perceived weight of a VR headset worn on a user's head includes: a support part that has one side fixed to a support surface and the other side extending from the support surface to an upper space of the user; a wire that has one end disposed in one area of the support part and the other end disposed so as to be exposed to the other side of the support part; a mounting part that is provided at the other end of the wire and connected to the VR headset; and a tension part that is disposed at the support part and provides tension in a direction in which the other end of the wire is pulled toward one end of the wire.

The tension provided to the wire by the tension part may be equal to or less than a force supporting a combined weight of the VR headset and the mounting part.

The wire may have one end fixed to one point of the support part and the other end exposed to the other end of the support part, and the tension part may include: at least one moving pulley that is disposed on the wire to reduce the perceived weight of the VR headset; at least one fixed pulley that is provided on the support part to support the wire on the support part; and a first weight that is connected to the moving pulley.

A weight of the first weight may be equal to or less than ½ of the combined weight of the VR headset and the mounting part.

The support surface may be a floor surface, the support part may include a first support extending upward from the floor surface, and a second support extending in a cantilever shape from an upper end of the first support, insides of the first support and the second support may be hollow so that the first support and the second support communicate with each other, and the moving pulley may be disposed inside the first support and the fixed pulley may be disposed inside the second support, so the perceived weight of the VR headset is reduced by the moving pulley.

A length of the wire exposed from the second support may vary as the moving pulley moves up and down inside the first support according to user's movement.

The moving pulley may slide up and down along the first support.

The wire may have one end disposed at one point of the support part and the other end disposed at the other end of the support part, and the tension part may include: at least one fixed pulley that is provided on the support part to support the wire on the support part; and a second weight that is fixed to one end of the wire.

A weight of the second weight may be equal to or less than the combined weight of the VR headset and the mounting part.

The support surface may be a floor surface, the support part may include a third support extending upward from the floor surface, and a fourth support extending in a cantilever shape from an upper end of the first support, and the second weight may be disposed around the third support and the fixed pulley may be disposed on the fourth support, so the perceived weight of the VR headset is reduced by the second weight.

A length of the wire exposed from the fourth support may vary as the second weight moves up and down around the third support according to user's movement, and the second weight may slide up and down along the third support.

The wire may have one end disposed at one point of the support part and the other end exposed to the other end of the support part, and the tension part may include: at least one fixed pulley that is provided on the support part to support the wire on the support part; and a reel spring that is disposed at one point of the support part and has one end of the wire fixed thereto.

The tension provided by the reel spring may be equal to or less than a force corresponding to the combined weight of the VR headset and the mounting part.

The support surface may be a floor surface, the support part may include a fifth support extending upward from the floor surface, and a sixth support extending in a cantilever shape from an upper end of the fifth support, insides of the fifth support and the sixth support may be hollow so that the fifth support and the sixth support communicate with each other, and the reel spring may be disposed inside the fifth support and the fixed pulley may be disposed inside the sixth support, so the perceived weight of the VR headset is reduced by the reel spring.

The length of the wire exposed from the sixth support may vary as the reel spring is coiled or uncoiled according to user's movement.

The wire may be a power line, and power may be supplied to the VR headset through the wire.

The support part may be provided with a power supply means, and one end of the wire may be connected to the power supply means and the other end of the wire may be electrically connected to the VR headset, so power is supplied to the VR headset.

The mounting part may be configured to rotate according to the user's movement to prevent twisting of the wire.

The mounting part may include: a mounting body that fixes the VR headset at at least one point; and a connecting body that is provided on the mounting body and connected to the other end of the wire, and prevents the wire rotating according to the user's movement from being twisted in the mounting body.

A length of one side of the support part may vary so that a height of the other side varies according to a height of the user.

DETAILED DESCRIPTION

Figure 1:
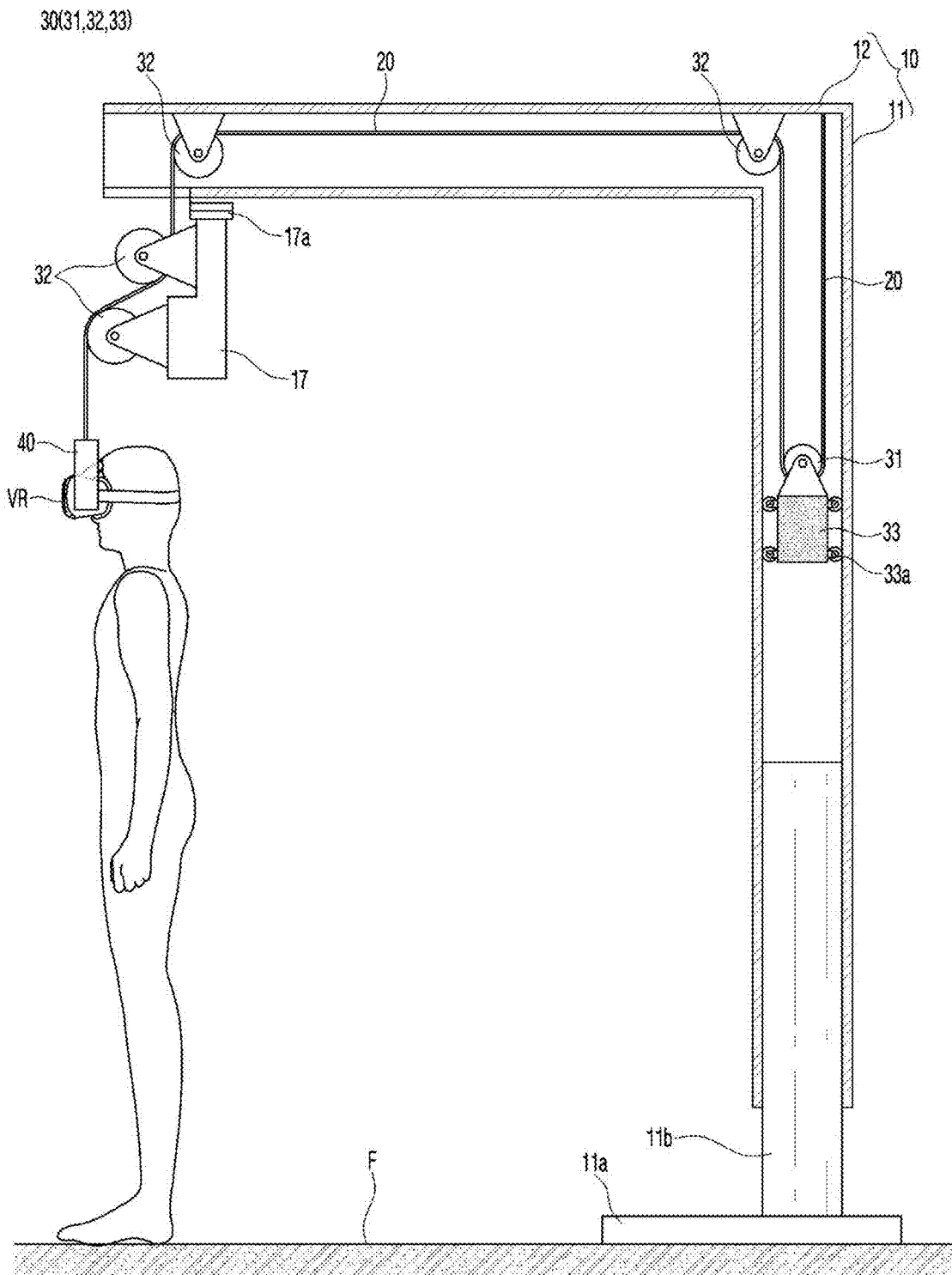
FIG. 1 is a diagram illustrating an apparatus for reducing a perceived weight of a VR headset according to a first embodiment of the present disclosure.

Hereafter, embodiments of the present disclosure will be described in detail with reference to the accompanying drawings and the same or similar components are given the same reference numerals regardless of the numbers of figures and are not repeatedly described.

In addition, terms "module" and "unit" for components used in the following description are used only to easily make the disclosure. Therefore, these terms do not have meanings or roles that distinguish from each other in themselves.

When it is decided that a detailed description for the known art related to the present disclosure may obscure the gist of the present disclosure, the detailed description will be omitted. In addition, it should be understood that the accompanying drawings are provided only in order to allow exemplary embodiments of the present disclosure to be easily understood, and the spirit of the present disclosure is not limited by the accompanying drawings, but includes all the modifications, equivalents, and substitutions included in the spirit and the scope of the present disclosure.

The terms including ordinal numbers such as 'first' and 'second' may be used to describe various components, but these components are not limited by these terms. The terms are used only to distinguish one component from another component.

It is to be understood that when one component is referred to as being "connected to" or "coupled to" another component, one component may be connected directly to or coupled directly to another component or be connected to or coupled to another component with the other component interposed therebetween. On the other hand, it is to be understood that when one component is referred to as being "connected directly to" or "coupled directly to" another component, it may be connected to or coupled to another component without the other component interposed therebetween.

Singular forms are intended to include plural forms unless the context clearly indicates otherwise.

It should be further understood that terms "include" or "have" used in the present specification specify the presence of features, numerals, steps, operations, components, parts mentioned in the present specification, or combinations thereof, but do not preclude the presence or addition of one or more other features, numerals, steps, operations, components, parts, or combinations thereof.

Figure 2:
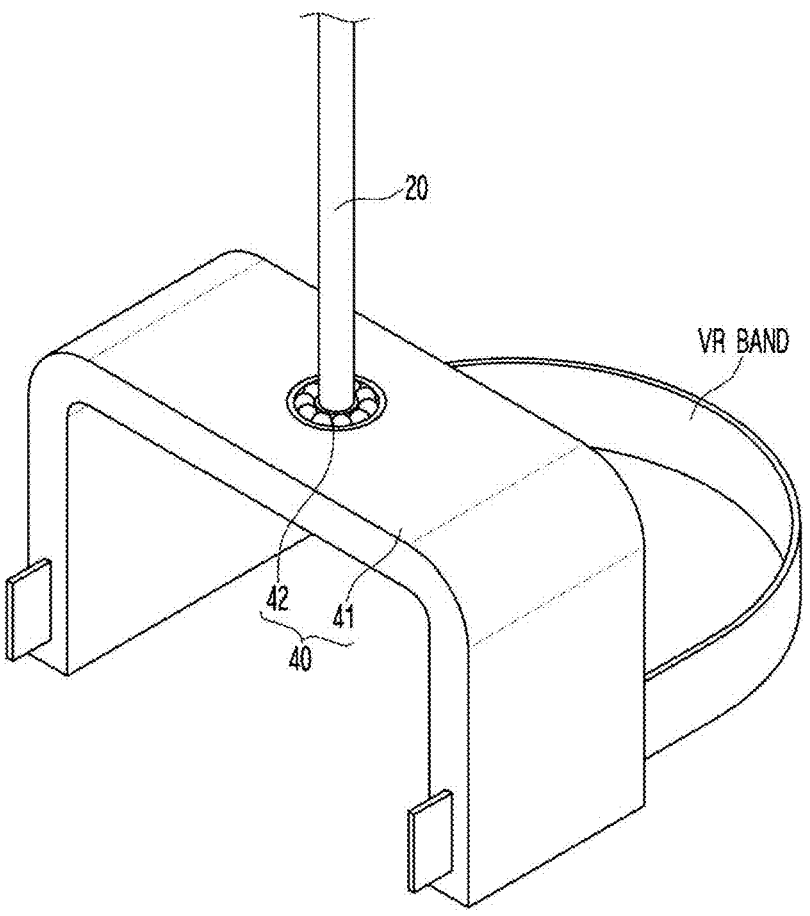
FIG. 2 is a diagram illustrating a main part of a mounting part according to the first embodiment of the present disclosure.

FIG. 1 is a diagram illustrating an apparatus for reducing a perceived weight of a VR headset according to a first embodiment of the present disclosure, and FIG. 2 is a diagram illustrating a main part of a mounting part according to the first embodiment of the present disclosure.

As illustrated in FIGS. 1 and 2, the apparatus for reducing a perceived weight of a VR headset according to the first embodiment of the present disclosure is an apparatus for reducing a perceived weight of a VR headset worn on a user's head by using the principle of a moving pulley, and includes a support part 10 that has one side fixed to a support surface and the other side extending from the support surface to an upper space of the user; a wire 20 that has one end disposed in one area of the support part 10 and the other end exposed to the other side of the support part 10 so as to be connected to the VR headset VR; and a tension part 30 that is disposed at the support part 10 and provides tension in a direction in which the other end of the wire 20 is pulled toward one end of the wire 20. The apparatus further includes a mounting part 40 that is provided at the other end of the wire and connected to the VR headset VR.

For example, the support part 10 is a means for supporting other components such as the wire 20 and the tension part 30, and one side of the support part 10 is fixed to a support surface with a fixing force, and the other side thereof extends to an upper space of a user. Here, the meaning that the support part 10 is fixed to the support surface is not limited to a specific fixing method, but it means that the support part 10 may be disposed on a support surface and changed and implemented in various ways so that a posture may be maintained originally. In addition, it may include a case where the support part is attached to the support surface by a separate means, that is, a fixing means such as an anchor bolt, and the posture is maintained, a case where the support part, which is a heavy object, is simply disposed on the support surface and the posture is maintained, and a case where the support part is supported by a separate heavy object while being simply placed on the support surface and the posture is maintained.

For example, the support surface may be a surface forming a predetermined space such as a VR headset, a wall surface, a ceiling surface, and furniture, and may be a separate fixture provided on the VR headset VR, a wall surface, a ceiling surface, and furniture. In the present embodiment, the VR headset VR F is selected as an example of the support surface and described.

For example, the support part 10 includes a first support 11 extending upward from the VR headset VR F, and a second support 12 extending in a cantilever shape from an upper end of the first support 11. Thus, a lower end of the first support 11 is fixed to the VR headset VR F, and the second support 12 extends from the upper end of the first support 11 to an upper space of the user.

In this case, insides of the first support 11 and the second support 12 are hollow so that the first support 11 and the second support 12 communicate with each other. Thus, the wire 20 and the tension part 30 are accommodated and disposed in the internal space of the first support 11 and the second support 12.

Meanwhile, a length of one side of the support part 10 may vary so that a height of the other side may vary according to a user's height.

For example, a means for varying the height may be configured between the first support 11 and the VR headset VR F. For example, a fixed plate 11a fixed to the VR headset VR F may be provided, and a height adjustment bar 11b of a predetermined length may be provided to be inserted into the inside of the first support 11 from an upper surface of the fixed plate 11a. Thus, an installation height of the first support 11 may be adjusted while the height adjustment bar 11b is inserted into the inside of the first support 11, and then the first support 11 and the height adjustment bar 11b may be fixed. In this case, the fixing of the first support 11 and the height adjustment bar 11b is not illustrated in the drawing, but may be changed and implemented in various ways. For example, by forming a plurality of grooves on an outer circumferential surface of the height adjustment bar 11b at predetermined intervals along an up-and-down direction, and forming a groove on a lower portion of one side of the first support 11 and then inserting a pin penetrating through one of the grooves formed in the height adjustment bar 11b and the groove formed in the first support 11, the installation height of the first support 11 may be adjusted and then fixed.

Meanwhile, the support part 10 may include a rotary support 17 that supports the other side of the wire 20 at the other end portion of the other side and pivots the wire 20 according to the user's movement.

For example, the rotary support 17 that extends downward via a rotating plate 17a may be provided at a lower portion of the other side of the first support 11. Accordingly, since the other side of the wire 20 is supported to freely rotate on the rotary support 17, when the user moves and rotates while wearing the VR headset VR, the wire 20 does not get twisted and may move smoothly according to the user's movement.

In this case, it is preferable that the rotary support 17 is provided with at least one fixed pulley 32 that supports the wire 20.

For example, the wire 20 is a means for providing tension to the VR headset VR in order to reduce the perceived weight of the VR headset VR, and one end is disposed in one area of the support part 10, and the other end is exposed to the other side of the support part 10 and connected to the VR headset VR.

In this case, a material of the wire 20 is not limited to a specific material, but it is preferable to manufacture the wire 20 using a material with small elasticity in order to maintain tension.

For example, the tension part 30 is a means for providing tension to the wire 20 in order to reduce the perceived weight of the VR headset VR, and provides tension in the direction in which the other end of the wire 20 is pulled toward one end of the wire 20 while being disposed in the support part 10.

In the present embodiment, the tension part 30 provides tension to the wire 20 by a combination of a moving pulley 31 and a fixed pulley 32.

For example, the tension part 30 includes at least one moving pulley 31 that is disposed on the wire 20 to reduce the perceived weight of the VR headset VR, at least one fixed pulley 32 that is disposed on the support part 10 to support the wire 20 on the support part 10, and a first weight 33 that is connected to the moving pulley 31.

For example, the moving pulley 31 is a means for providing tension to the wire 20 so as to substantially reduce the perceived weight of the VR headset VR, and is provided to be accommodated inside the first support 11. Thus, the moving pulley 31 is supported by the wire 20 inside the first support 11 and moves in the up-and-down direction.

For example, the fixed pulley 32 is a means that is installed at a point where the movement direction of the wire 20 accommodated inside the first support 11 and the second support 12 changes to support the wire 20, and a plurality of fixed pulleys are disposed inside the second support 12 along the movement path of the wire 20. For example, it is preferable that the fixed pulley 32 may be at least installed at a point where the first support 11 and the second support 12 are connected and at an upper point of the user, i.e., a point on the other side of the second support 12 to change the movement direction of the wire 20.

For example, the first weight 33 is a weight provided on the moving pulley 31 to provide tension to the wire, and the weight of the first weight 33 may be changed according to the weight of the VR headset VR and the number of moving pulleys 31. For example, the weight of the first weight 33 is preferably equal to or less than ½ of the combined weight of the VR headset VR and the mounting part. When the weight of the first weight 33 exceeds ½ of the combined weight of the VR headset VR and the mounting part, excessive tension may be provided to the wire 20, causing the problem that the VR headset VR comes off or the wearing comfort is reduced while the user is wearing the VR headset VR.

Meanwhile, as the moving pulley 31 moves in the up-and-down direction inside the first support 11 according to the user's movement, the length of the wire exposed from the second support 12 varies. In this way, as the length of the wire 20 exposed from the second support 12 varies, the tension may be smoothly maintained on the wire even when the user moves.

In addition, in order for the moving pulley 31 to smoothly move in the up-and-down direction inside the first support 11, the first weight 33 provided on the moving pulley 31 may be provided to slide along the inner wall of the first support 11.

For example, the first weight 33 may be provided with a plurality of wheels 33a that slide on the inner wall of the first support 11. Thus, when the moving pulley 31 moves in the up-and-down direction, wheels 33a slide on the inner wall of the first support 11, thereby inducing the smooth movement of the moving pulley 31.

Meanwhile, in the present embodiment, the mounting part 40 that connects the wire 20 and the VR headset VR is provided.

As illustrated in FIG. 2, the mounting part 40 is a means for connecting the wire 20 and the VR headset VR, and is provided at the other end of the wire 20 so that it can be detached from and attached to the VR headset VR.

In particular, it is preferable that the mounting part 40 is configured to rotate according to the user's movement in order to prevent the wire 20 from being twisted.

For example, the mounting part 40 includes a mounting body 41 that fixes the VR headset VR at at least one point, and a connecting body 42 that is provided on the mounting body 41, connected to the other end of the wire, and rotates according to the user's movement.

For example, the shape and configuration of the mounting body 41 are not limited to a specific shape and configuration, but it is preferable that the connecting body 42 is provided on a surface exposed upward and formed in a configuration that can be detached from and attached to the VR headset VR. For example, it is preferable that the mounting body 41 has a width as wide as the VR headset VR and is formed so that it can be detached from and attached to a VR band connected to both sides of the VR headset VR by being bent downward at both end portions. For example, in the present embodiment, the VR band is implemented in a way that it penetrates through the bent portions on both sides of the mounting body 41 and is detached and attached. Of course, the mounting body 41 is not limited to being formed so that it can be detached from and attached to the VR band, and the mounting body 41 may be formed so that it can be directly detached from and attached to the VR headset VR.

For example, the connecting body 42 is provided on the upper surface of the mounting body 41 and connected to the other end of the wire. In this case, it is preferable that the other end of the wire 20 is fixed to the connecting body 42 or the wire is configured so that it can be attached and detached.

For example, the connecting body 42 is a means for preventing twisting in the mounting body 41 even when the wire rotates, and various configurations may be applied so that the wire 20 may rotate or pivot smoothly. In the present embodiment, the connecting body 42 is implemented as a ball bearing type so that the wire 20 connected to extend upward from the upper surface of the mounting body 41 may rotate or pivot smoothly.

The operating state of the apparatus for reducing a perceived weight of a VR headset according to the first embodiment configured as described above will be described.

First, the user adjusts the height of the first support 11 according to the user's height. Then, the VR headset VR is connected to the mounting part 40 connected to the end portion of the wire 20.

Then, the predetermined tension is provided to the wire 20 by the weight of the moving pulley 31 and the first weight 33, and the perceived weight of the VR headset VR is more reduced than the actual weight while the direction of the tension provided through the wire 20 acts in the opposite direction to the direction of gravity.

In this state, the user puts the VR headset VR on his/her head and operates the VR headset VR to experience the virtual reality.

The user moves or rotates while experiencing the virtual reality. In this case, the length of the wire 20 exposed from the second support 12 varies according to the user's movement or rotation, and this movement is achieved by the moving pulley 31 moving in the up-and-down direction inside the first support 11.

While the length of the wire 20 exposed from the second support 12 varies, the predetermined tension is provided to the VR headset VR through the wire 20, so the user may maintain the perceived weight that is more reduced than the actual weight of the VR headset VR.

Figure 3:
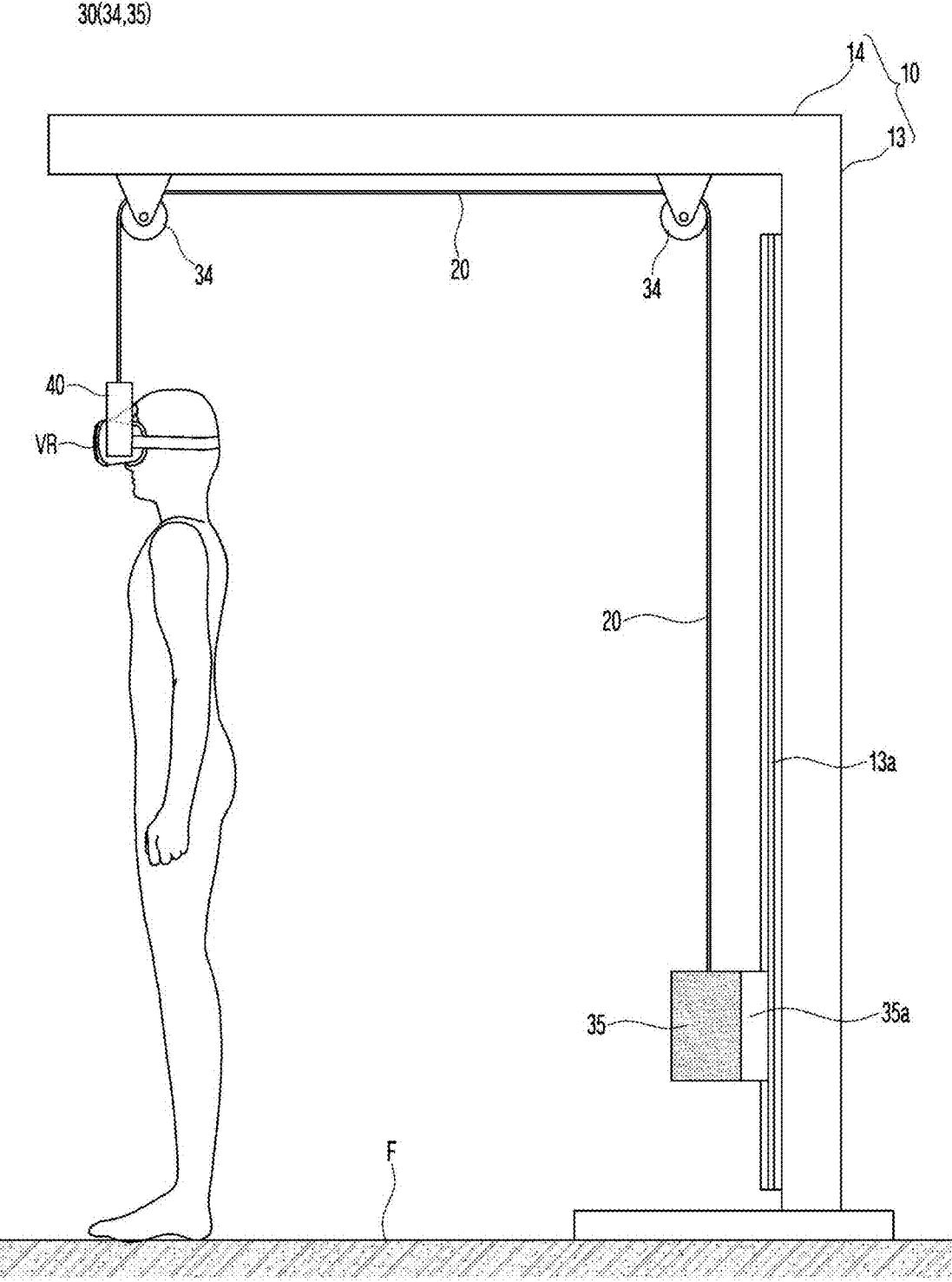
FIG. 3 is a diagram illustrating an apparatus for reducing a perceived weight of a VR headset according to a second embodiment of the present disclosure.

FIG. 3 is a diagram illustrating an apparatus for reducing a perceived weight of a VR headset according to a second embodiment of the present disclosure.

As illustrated in FIG. 3, the apparatus for reducing a perceived weight of a VR headset according to the second embodiment of the present disclosure largely includes the support part 10, the wire 20, the tension part 30, and the mounting part 40, similar to the first embodiment described above. In this case, the wire 20 and the mounting part 40 are implemented in the same configuration as the first embodiment described above, and therefore, redundant descriptions thereof will be omitted.

However, the tension part 30 provides tension to the wire by a combination of a fixed pulley 34 and a second weight 35.

Meanwhile, the support part 10 according to the second embodiment is formed in the cantilever shape, similar to the support part 10 of the first embodiment.

However, the tension part 30 is not disposed in the hollow inside, but is disposed on the outside of the support part 10.

For example, the support part 10 includes a third support 13 extending upward from the floor surface F and a fourth support 14 extending in the cantilever shape from the upper end of the third support 13. Therefore, the overall shape has a similar shape to the support part 10 of the first embodiment. However, the third support 13 and the fourth support 14 do not need to have hollow insides and communicate with each other.

In this case, the support part 10 may also have a configuration such as a fixed plate 11a and a height adjustment bar 11b for adjusting the height of the support part 10 that is the configuration presented in the first embodiment. In addition, the configuration such as the rotary support 17 extending downward via a rotating plate 17a that is the configuration presented in the first embodiment may also be applied.

Meanwhile, the wire 20 is supported by the fixed pulley 34 forming the tension part 30 on the outside of the third support 13 and the fourth support 14. Therefore, one end of the wire is disposed at one point of the support part 10 and the other end is disposed at the other end of the support part 10.

The tension part 30 includes at least one fixed pulley 34 that is provided on the support part 10 to support the wire 20 on the support part 10, and a second weight 35 that is fixed to one end of the wire 20.

For example, the fixed pulley 34 is a means that is installed at a point where the movement direction of the wire

20 changes outside the third support 13 and the fourth support 14 to support the wire 20, and a plurality of fixed pulleys are disposed along the movement path of the wire 20 in the lower direction of the fourth support 14. For example, it is preferable that the fixed pulley 34 may be at least installed at a point where the third support 13 and the fourth support 14 are connected and at an upper point of the user, i.e., a point on the other side of the fourth wire 20, and thus is installed at a point where the movement direction of the wire 20 changes.

For example, the second weight 35 is a weight provided at one end of the wire 20 around the fourth support 14 to provide tension to the wire 20. For example, it is preferable that the weight of the second weight 35 is equal to or less than the combined weight of the VR headset VR and the mounting part 40. When the weight of the second weight 35 exceeds the combined weight of the VR headset VR and the mounting part 40, excessive tension may be provided to the wire 20, causing the problem that the VR headset VR comes off or the wearing comfort is reduced while the user is wearing the VR headset VR.

Meanwhile, as the second weight 35 moves in an up-and-down direction outside the third support 13 according to the user's movement, the length of the wire 20 exposed outside the fourth support 14 changes. In this way, as the length of the wire 20 exposed from the fourth support 14 varies, the tension may be smoothly maintained on the wire even when the user moves.

In addition, the second weight 35 may be provided so that the second weight 35 slides along an outer wall of the third support 13 so as to move smoothly in the up-and-down direction from the outside of the third support 13.

For example, the second weight 35 may be provided with an LM guide 35a that slides on the outer wall of the third support 13, and the outer wall of the third support 13 may be provided with a rail 13a along which the LM guide 35a slides along the up-and-down direction. Thus, when the second weight 35 moves in the up-and-down direction, the LM guide 35a induces the smooth movement of the second weight 35 while sliding on the rail 13a.

The operating state of the apparatus for reducing a perceived weight of a VR headset according to the second embodiment configured as described above will be described.

First, the user adjusts the height of the third support 13 according to the user's height. Then, the VR headset VR is connected to the mounting part 40 connected to the end portion of the wire 20.

Then, the predetermined tension is provided to the wire 20 by the weight of the second weight 35, and the perceived weight of the VR headset VR is more reduced than the actual weight while the direction of the tension provided through the wire 20 acts in the opposite direction to the direction of gravity.

In this state, the user puts the VR headset VR on his/her head and operates the VR headset VR to experience the virtual reality.

The user performs the movement or rotation operation while experiencing the virtual reality. In this case, the length of the wire 20 exposed outside the fourth support 14 varies according to the user's movement or rotation, and this movement is achieved by moving the second weight 35 in the up-and-down direction outside the third support 13.

While the length of the wire 20 exposed from the fourth support 14 varies, the predetermined tension is provided to the VR headset VR through the wire 20, so the user may maintain the perceived weight that is more reduced than the actual weight of the VR headset VR.

Figure 4:
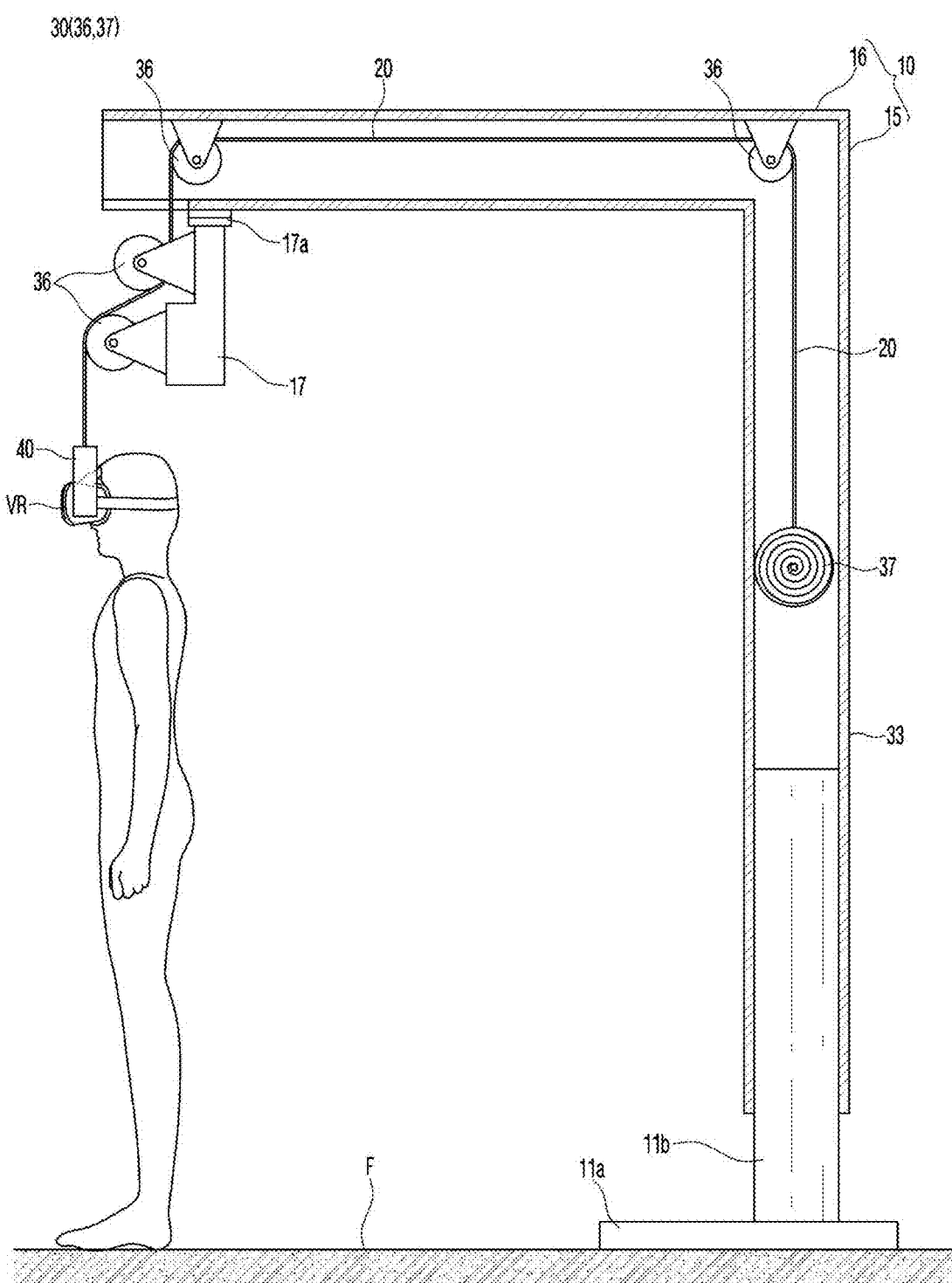
FIG. 4 is a diagram illustrating an apparatus for reducing a perceived weight of a VR headset according to a third embodiment of the present disclosure.

FIG. 4 is a diagram illustrating an apparatus for reducing a perceived weight of a VR headset according to a third embodiment of the present disclosure.

As illustrated in FIG. 4, the apparatus for reducing a perceived weight of a VR headset according to the third embodiment of the present disclosure largely includes the support part 10, the wire 20, the tension part 30, and the mounting part 40, similar to the first embodiment described above. In this case, the support part 10, the wire 20, and the mounting part 40 are implemented in the same configuration as the first embodiment described above, and therefore, a duplicate description thereof will be omitted.

However, the tension part 30 provides tension to the wire 20 by a combination of a reel spring 37 and a fixed pulley 36.

Meanwhile, the support part 10 according to the third embodiment is formed in the cantilever shape, similar to the support part 10 of the first embodiment.

For example, the support part 10 includes a fifth support 15 extending upward from the floor surface F and a sixth support 16 extending in the cantilever shape from the upper end of the fifth support 15. In this case, the insides of the fifth support 15 and the sixth support 16 are hollow so that the fifth support 15 and the sixth support 16 communicate with each other.

In this case, the support part 10 may also have a configuration such as a fixed plate 11a and a height adjustment bar 11b for adjusting the height of the support part 10 that is the configuration presented in the first embodiment. In addition, the configuration such as the rotary support 17 extending downward via a rotating plate 17a that is the configuration presented in the first embodiment may also be applied.

Meanwhile, as in the first embodiment, one end of the wire 20 is disposed at one point of the support part 10 and the other end is exposed to the other end of the support part 10.

The tension part 30 includes at least one fixed pulley 36 that is provided in the support part 10 to support the wire on the support part 10, and a reel spring 37 that is disposed at one point of the support part 10 to fix one end of the wire 20.

In this case, the fixed pulley 36 is a means that is installed at a point where the movement direction of the wire 20 accommodated inside the fifth support 15 and the sixth support 16 changes to support the wire 20, and a plurality of fixed pulleys are disposed inside the sixth support 16 along the movement path of the wire 20. For example, it is preferable that the fixed pulley 36 may be at least installed at a point where the fifth support 15 and the sixth support 16 are connected and at an upper point of the user, i.e., a point on the other side of the sixth support 16, and thus is installed at a point where the movement direction of the wire 20 changes.

For example, the reel spring 37 is a means for providing tension to the wire. For example, it is preferable that the tension provided by the reel spring 37 is equal to or less than the force corresponding to the combined weight of the VR headset VR and the mounting part 40. When the tension provided by the reel spring 37 exceeds the force corresponding to the combined weight of the VR headset VR and the mounting part 40, excessive tension may be provided to the wire 20, causing the problem that the VR headset VR comes off or the wearing comfort is reduced while the user is wearing the VR headset VR.

Meanwhile, as the reel spring 37 is coiled or uncoiled according to the user's movement, the length of the wire 20 exposed from the sixth support 16 varies. In this way, as the length of the wire 20 exposed from the sixth support 16 varies, the tension may be smoothly maintained on the wire even when the user moves.

The operating state of the apparatus for reducing a perceived weight of a VR headset according to the third embodiment configured as described above will be described.

First, the user adjusts the height of the fifth support 15 according to the user's height. Then, the VR headset VR is connected to the mounting part 40 connected to the end portion of the wire.

Then, the predetermined tension is provided to the wire 20 by the reel spring 37, and the perceived weight of the VR headset VR is more reduced than the actual weight while the direction of the tension provided through the wire 20 acts in the opposite direction to the direction of gravity.

In this state, the user puts the VR headset VR on his/her head and operates the VR headset VR to experience the virtual reality.

The user moves or rotates while experiencing the virtual reality. In this case, the length of the wire 20 exposed outside the sixth support 16 varies according to the user's movement or rotation, and this movement is achieved by coiling or uncoiling the reel spring 37.

While the length of the wire 20 exposed from the sixth support 16 varies, the predetermined tension is provided to the VR headset VR through the wire 20, so the user may maintain the perceived weight that is more reduced than the actual weight of the VR headset VR.

Figure 5:
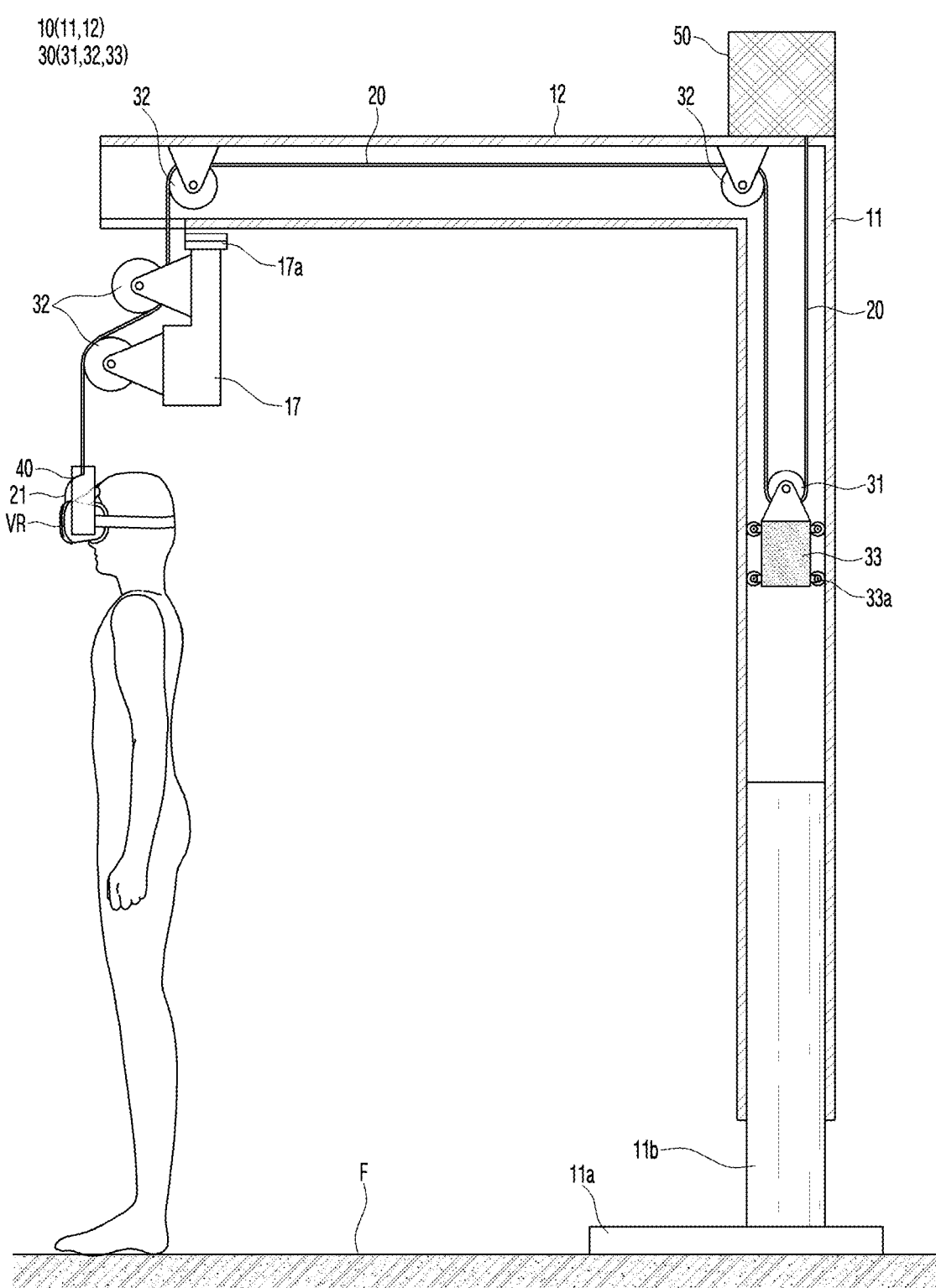
FIG. 5 is a diagram illustrating an apparatus for reducing a perceived weight of a VR headset according to a fourth embodiment of the present disclosure.

FIG. 5 is a diagram illustrating an apparatus for reducing a perceived weight of a VR headset according to a fourth embodiment of the present disclosure.

As illustrated in FIG. 5, the apparatus for reducing a perceived weight of a VR headset according to the fourth embodiment of the present disclosure largely includes the support part 10, the wire 20, the tension part 30, and the mounting part 40, similar to the first embodiment described above. In this case, the support part 10, the tension part 30, and the mounting part 40 are implemented in the same configuration as the first embodiment described above, and therefore, a duplicate description thereof will be omitted.

However, the wire 20 may serve as a mediation means for providing tension to the VR headset VR to reduce the perceived weight of the VR headset VR and at the same time, also serve as a mediation means for supplying power to the VR headset VR by being provided as a power line.

To this end, the inside of the wire 20 may be provided with a conductive wire and the outside may be provided with a covering material that wraps and covers the wire. In addition, a connection means for electrical connection may be provided at both ends of the wire 20. For example, the connection means may be a C-type USB terminal. Of course, the connection means is not limited to the presented C-type USB terminal, but may be various terminals or plugs that may electrically connect the wire 20 to the VR headset VR or a power supply means 50 to be described later.

Therefore, one end of the wire 20 may be connected to the power supply means 50 by the connection means provided at both ends, and the other end may be electrically connected to the VR headset VR, so power may be supplied from the power supply means 50 to the VR headset VR.

In this case, the other end of the wire 20 may be provided with a wire extension 21 that extends from the portion connected to the mounting part 40 to the VR headset VR in order to be electrically connected to the VR headset VR. Therefore, the other side of the wire 20 may have a wire extension 21 that extends from the portion connected to the mounting part 40, and an end portion of the wire extension 21 may be provided with the C-type USB terminal.

Meanwhile, the support part 10 according to the fourth embodiment is formed in the cantilever shape, similar to the support part 10 of the first embodiment.

For example, the support part 10 includes the first support 11 extending upward from the floor surface F and the second support 12 extending in the cantilever shape from the upper end of the first support 11. In this case, the insides of the first support 11 and the second support 12 are hollow so that the first support 11 and the second support 12 communicate with each other.

However, the support part 10 according to the fourth embodiment may be provided with the power supply means 50. In this case, the power supply means 50 may be implemented as various means capable of supplying power to the VR headset VR through the wire 20. For example, the power supply means 50 may be a battery. In addition, the power supply means 50 may be an outlet from which power is supplied from the outside. Of course, the power supply means 50 is not limited to the battery or outlet presented, and various means capable of supplying power to the VR headset VR through the wire 20 may be applied.

The power supply means 50 may be provided in various ways on the support part 10. For example, the power supply means 50 may be installed on the upper portion of the second support 12, and one end of the wire 20 may penetrate through the second support 12 and be electrically connected to the power supply means 50.

The operating state of the apparatus for reducing a perceived weight of a VR headset according to the fourth embodiment configured as described above will be described.

The operating state of the apparatus for reducing a perceived weight of a VR headset according to the fourth embodiment is implemented in the same manner as the apparatus for reducing a perceived weight of a VR headset according to the first embodiment except that power can be supplied to the VR headset VR through the wire 20 and the power supply means 50, and therefore, the redundant descriptions thereof will be omitted.

First, the user adjusts the height of the first support 11 according to the user's height. Then, the VR headset VR is connected to the mounting part 40 connected to the end portion of the wire 20.

In this case, one end of the wire 20 is electrically connected to the power supply means 50. Then, the wire extension 21 extending from the other end of the wire 20 is electrically connected to the VR headset VR.

Then, the predetermined tension is provided to the wire 20 by the weight of the moving pulley 31 and the first weight 33, and the perceived weight of the VR headset VR is more reduced than the actual weight while the direction of the tension provided through the wire 20 acts in the opposite direction to the direction of gravity. In addition, power is supplied to the VR headset VR from the power supply means 50 through the wire 20.

In this state, the user puts the VR headset VR on his/her head and operates the VR headset VR to experience the virtual reality.

Then, the user may wear the VR headset VR in a state where the perceived weight of the VR headset VR is reduced compared to the actual weight, and at the same time, power may be continuously supplied to the VR headset VR.

According to an embodiment of the present disclosure, when the user wears the VR headset on his/her head, by maintaining the tension in the direction that reduces the weight of the VR headset using the pulley or the reel spring, it is possible to more reduce the perceived weight felt by the user than the actual weight of the VR headset.

In addition, by including the components that facilitate the movement and rotation of the wire connected to the VR headset in the support part and the mounting part, it is possible to ensure the free movement and rotation while the user wears the VR headset on his/her head.

Although the present disclosure has been described with reference to the accompanying drawings and the preferred embodiments described above, the present disclosure is not limited thereto, but is defined by the scope of the claims set forth below. Accordingly, those skilled in the art can modify and change the present disclosure in various ways without departing from the technical idea of the patent claims described below.

What is claimed is:

1. An apparatus for reducing a perceived weight of a virtual reality (VR) headset configured to be worn on a user's head, the apparatus comprising:

a support part including one side fixed to a support surface and the other side extending from the support surface to an upper space of the user;

a wire including one end disposed in and connected to one area of the support part and the other end disposed to be exposed to another area of the support part;

a mounting part disposed at the other end of the wire and connected to the VR headset; and a tension part disposed at the support part and configured to provide tension in a direction in which the other end of the wire is pulled toward the one end of the wire, wherein the other end of the wire is connected to the mounting part, wherein the tension part includes:

at least one moving pulley that is disposed on the wire to reduce the perceived weight of the VR headset;

at least one fixed pulley disposed on the support part to support the wire on the support part; and a first weight that is connected to the at least one moving pulley, wherein the support surface includes a floor surface, wherein the support part includes a first support extending upward from the floor surface, and a second support extending in a cantilever shape from an upper end of the first support, wherein insides of the first support and the second support are hollow, such that the first support and the second support communicate with each other, and wherein the at least one moving pulley is disposed inside the first support and the at least one fixed pulley is disposed inside the second support, such that the perceived weight of the VR headset is reduced by the at least one moving pulley.

2. The apparatus of claim 1, wherein the tension provided to the wire by the tension part is equal to or less than a force supporting a combined weight of the VR headset and the mounting part.

3. The apparatus of claim 1, wherein a weight of the first weight is equal to or less than ½ of a combined weight of the VR headset and the mounting part.

4. The apparatus of claim 1, wherein a length of the wire exposed from the second support varies as the at least one moving pulley moves up and down inside the first support according to user's movement.

5. The apparatus of claim 4, wherein the at least one moving pulley slides up and down along the first support.

6. The apparatus of claim 1, wherein the wire is a power line, and power is supplied to the VR headset through the wire.

7. The apparatus of claim 6, wherein the support part is provided with a power supply, and the one end of the wire is connected to the power supply, and the other end of the wire is electrically connected to the VR headset, such that power is supplied to the VR headset.

8. The apparatus of claim 1, wherein the mounting part is configured to rotate according to user's movement to prevent twisting of the wire.

9. The apparatus of claim 8, wherein the mounting part includes:

a mounting body that fixes the VR headset at at least one point; and a connecting body that is disposed on the mounting body and connected to the other end of the wire, and prevents the wire rotating according to the user's movement from being twisted in the mounting body.

10. The apparatus of claim 1, wherein a length of the one side of the support part varies such that a height of the other side of the support part varies according to a user's height.

11. An apparatus for reducing a perceived weight of a virtual reality (VR) headset configured to be worn on a user's head, the apparatus comprising:

a support part including one side fixed to a support surface and the other side extending from the support surface to an upper space of the user;

a wire including one end disposed adjacent to one area of the support part and the other end disposed to be exposed to another area of the support part;

a mounting part disposed at the other end of the wire and connected to the VR headset; and a tension part disposed at the support part and configured to provide tension in a direction in which the other end of the wire is pulled toward the one end of the wire, wherein the other end of the wire is connected to the mounting part, wherein the tension part includes:

at least one fixed pulley that is provided on the support part to support the wire on the support part; and a first weight that is fixed to the one end of the wire, wherein the support surface includes a floor surface, wherein the support part includes a first support extending upward from the floor surface, and a second support extending in a cantilever shape from an upper end of the first support, wherein the first weight is disposed around the first support and the at least one fixed pulley is disposed on the second support, such that the perceived weight of the VR headset is reduced by the first weight, wherein a length of the wire exposed from the second support varies as the first weight moves up and down around the first support according to user's movement, and wherein the first weight slides up and down along the first support.

12. The apparatus of claim 11, wherein a weight of the first weight is equal to or less than a combined weight of the VR headset and the mounting part.

13. An apparatus for reducing a perceived weight of a virtual reality (VR) headset configured to be worn on a user's head, the apparatus comprising:

a support part including one side fixed to a support surface and the other side extending from the support surface to an upper space of the user;

a wire including one end disposed in one area of the support part and the other end disposed to be exposed to another area of the support part;

a mounting part disposed at the other end of the wire and connected to the VR headset; and a tension part disposed at the support part and configured to provide tension in a direction in which the other end of the wire is pulled toward the one end of the wire, wherein the other end of the wire is connected to the mounting part, wherein the tension part includes:

at least one fixed pulley disposed on the support part to support the wire on the support part; and a reel spring disposed at the one point of the support part and including the one end of the wire, the one end of the wire being fixed to the reel spring, wherein the support surface includes a floor surface, wherein the support part includes a first support extending upward from the floor surface, and a second support extending in a cantilever shape from an upper end of the first support, wherein insides of the first support and the second support are hollow, such that the first support and the second support communicate with each other, and wherein the reel spring is disposed inside the first support and the at least one fixed pulley is disposed inside the second support, such that the perceived weight of the VR headset is reduced by the reel spring.

14. The apparatus of claim 13, wherein the tension provided by the reel spring is equal to or less than a force corresponding to a combined weight of the VR headset and the mounting part.

15. The apparatus of claim 13, wherein a length of the wire exposed from the second support varies as the reel spring is coiled or uncoiled according to user's movement.

\* \* \* \* \*